US 6,533,362 B1

(12) United States Patent  (10) Patent No.: US 6,533,362 B1
Simmons  (45) Date of Patent: Mar. 18, 2003

(54) JOINING METAL COMPONENTS (76) Inventor: Anthony Grant Simmons, 3 Ellis Ave., Alexandria, New South Wales (AU), 2015

( * ) Notice: Subject to any disclaimer, the term of this patent is extended or adjusted under 35 U.S.C. 154(b) by 0 days.

(21) Appl. No.: 09/433,408

(22) Filed: Nov. 3, 1999

Related U.S. Application Data (63) Continuation of application No. PCT/AU98/00271, filed on Apr. 17, 1998.

(30) Foreign Application Priority Data

Apr. 17, 1997 (AU) ............................................. PO6281

(51) Int. Cl.⁷ ........................... B60B 3/10; B60B 21/00; B60B 25/00; B23P 19/00
(52) U.S. Cl. ..................... 301/63.1; 301/95; 29/894.322
(58) Field of Search .................... 29/894.322; 301/63.1, 301/64.2, 64.3, 64.7, 95, 96, 97, 98

(56) References Cited

U.S. PATENT DOCUMENTS

| | | | | |
|---|---|---|---|---|
| 1,377,634 A | * | 5/1921 | Slick .......................... | 301/63.1 |
| 1,952,404 A | * | 3/1934 | Woodward .................. | 301/63.1 |
| 2,713,197 A | * | 7/1955 | Schmidt ..................... | 301/63.1 |
| 3,859,704 A | * | 1/1975 | Nasson ................... | 29/894.322 |
| 4,074,408 A | * | 2/1978 | Davis ..................... | 29/894.322 |
| 4,363,347 A | * | 12/1982 | Baumgartner .......... | 29/894.322 |
| 5,647,126 A | * | 7/1997 | Wei ........................ | 29/894.322 |
| 6,036,280 A | * | 3/2000 | Stanavich .................. | 301/63.1 |

FOREIGN PATENT DOCUMENTS

| | | | | |
|---|---|---|---|---|
| DE | 28393 | * | 5/1981 | ............ 29/894.322 |
| EP | 0193458 | | 9/1986 | |
| EP | 0309747 | | 4/1989 | |
| FR | 2561144 | | 9/1985 | |
| GB | 2308996 | | 7/1997 | |

* cited by examiner

Primary Examiner—S. Joseph Morano
Assistant Examiner—Jason R. Bellinger
(74) Attorney, Agent, or Firm—Baker Botts LLP (57) ABSTRACT

This invention concerns a method of joining forged, machined, formed or cast components with a metal tube. In another aspect, it concerns a metal object constructed according to the method. The tube is heated to expand its diameter, but not sufficiently to anneal it, or otherwise adversely affect its mechanical properties. Then, while the tube is still hot, it is pushed over part of the central component so that part of the tube overlies a circumferential groove in the central component. Then, while still hot, the circumferential part of the tube which overlies the groove, is rolled into the groove, so that when cooled the rolled part of the tube is clamped into the groove. The invention is particularly, but not exclusively, applicable to the construction of vehicle wheels having a forged, machined, formed or cast hub or center and a metal rim.

20 Claims, 5 Drawing Sheets

JOINING METAL COMPONENTS

This application is a continuation of PCT/AU98/00271, filed Apr. 17, 1998.

TECHNICAL FIELD

This invention concerns a method of joining forged, machined, formed or cast components with metal tube. In another aspect it concerns a metal object constructed according to the method. The invention is particularly, but not exclusively, applicable to the construction of vehicle wheels having a forged, machined, formed or cast hub or center and a metal rim.

A large number of techniques are available for the construction of objects such as fabricated car wheels, which require the joining of a circular rim component with a center or hub component. Welding is the most common form of joining these parts, but riveting, bolting, and bonding with adhesives are methods also used. Electric welding generate fumes, can distort the parts, can degrade the metallurgy of the parts, and requires high energy inputs and similarity of the metals to be jointed. Friction welding also requires similarity of the metals, expensive technology and machinery which imposes heavy loads on the parts during the joining process. Riveting and bolting methods require the provision of mating flanges which impose styling limitations and add weight to the wheel. The rivet and bolt holes are also points from which cracks can propagate and, particularly with bolted wheels, there is always the risk that the bolts are not tightened such that their performance is totally reliable in extended use. Bonding as the primary means of joining wheel components has not, to date, proved to have market acceptance, following a history of failures in the past.

SUMMARY OF THE INVENTION

The invention provides a method of joining forged, machined, formed or cast central components with metal tube. The method comprises the steps of:

heating the tube to expand its diameter, but not sufficiently to anneal it, or otherwise adversely affect its mechanical properties.

Then, while the tube is still hot, pushing the tube over part of the central component so that part of the tube overlies a circumferential groove in the central component.

Then, while still hot, rolling the circumferential part of the tube which overlies the groove, into the groove, so that when cooled the rolled part of the tube is clamped into the groove, and another part is shrunk on to the exterior of the central component.

This process may be cheap, and robust, giving reliable results which don't degrade the metallurgy of the joint. It has marketing credibility and offers freedom of styling.

As a preliminary step, the circumferential groove may be machined into the hub or center component.

Where an end of the metal tube is to be rolled into the circumferential groove in the central component, then a stop may be provided along one side of the groove. The heated tube may be pushed over the component from the other side until the end of the tube abuts the stop.

The end of the tube abutting the stop may be bevelled or knurled. After the end of the tube has been rolled into the groove, the stop may be spin forged, while the tube is still hot, into the space remaining in the groove as a result of the bevelling of the end of the tube. This gives a neat appearance and a smooth finish. The spin forged center material interlocks with the knurled tube end, providing reliable torque transmission capability for the joint. It also locks the joint against any axial movement and any tendency of the joint and of the rim to open up under load. It also provides a practical way of removing the stop and improving the appearance of the joint without recourse to a secondary operation.

The joint system relies for its integrity on the fact that the rolling and spin forging operations are done hot, that when the whole joint cools, the shrinkage of the formed metal in the joint, relatively to the center component provides a tight uniform clamping force with a high degree of pre-load.

It is important that the metal tube is heated only sufficiently to increase its ductility, or formability, but not enough to anneal the material or otherwise adversely affect its mechanical properties. For some materials, such as mild steel, which possesses very good formability in the as-supplied condition, heating is not required for any purpose other than to introduce the shrinkage factor into the joint.

Adhesive may be applied to the mating surfaces of the joint prior to assembly to provide a reliable torque transmission capability, and also to seal the joint.

As an alternative, or in addition to bevelling or knurling the end of the tube, dimples may be provided in the floor of the groove into which the tube is rolled in order to provide a mechanical interlock. This may be particularly useful where no stop is employed and the alloy tube is pushed entirely over the central component to extend from either side.

The operation may be applied to the fabrication of a vehicle wheel. In this case, the central component may be a cast, machined, formed or forged hub, and the metal rim of the wheel may comprise a formed tubular structure which is pushed on to the hub. The rim may be pushed on to the hub for a predetermined distance, or pushed right over the hub to extend either side by the desired amounts before the joining process is completed.

In another aspect, the invention provides a vehicle wheel comprising a central cast, machined, formed or forged hub or center, and a metal rim connected to the hub by being shrunk fit on to it and having at least one part roll formed down into a circumferential groove around the hub or center.

In addition a stop formed in part of the hub may be spin forged down over the top of the roll formed part of the rim. If the rim is bevelled or knurled before roll forming, then a space will be left afterwards into which the stop may be spin forged. Also in addition, a sealing material may be provided between the rim and the hub in order to improve the bonding, or seal the joint, or both. Dimples may also be introduced into the bed of the groove to provide a mechanical interlock when the rim is rolled into the groove.

The method is particularly suitable for the construction of the vehicle wheels due to the homogenous 360 degree clamping and locking affect which is able to be produced. In addition, the method provides for the isolation of the critical locking portion of the joint, that is the roll into the groove, by the shrink fit of the rim on to the central component.

BRIEF DESCRIPTION OF THE DRAWINGS

Examples of the invention will now be described with reference to the accompanying drawings, in which.

The same reference numerals have been used throughout the drawings to refer to corresponding features.

Best Modes for Carrying Out the Invention

Figure 1:
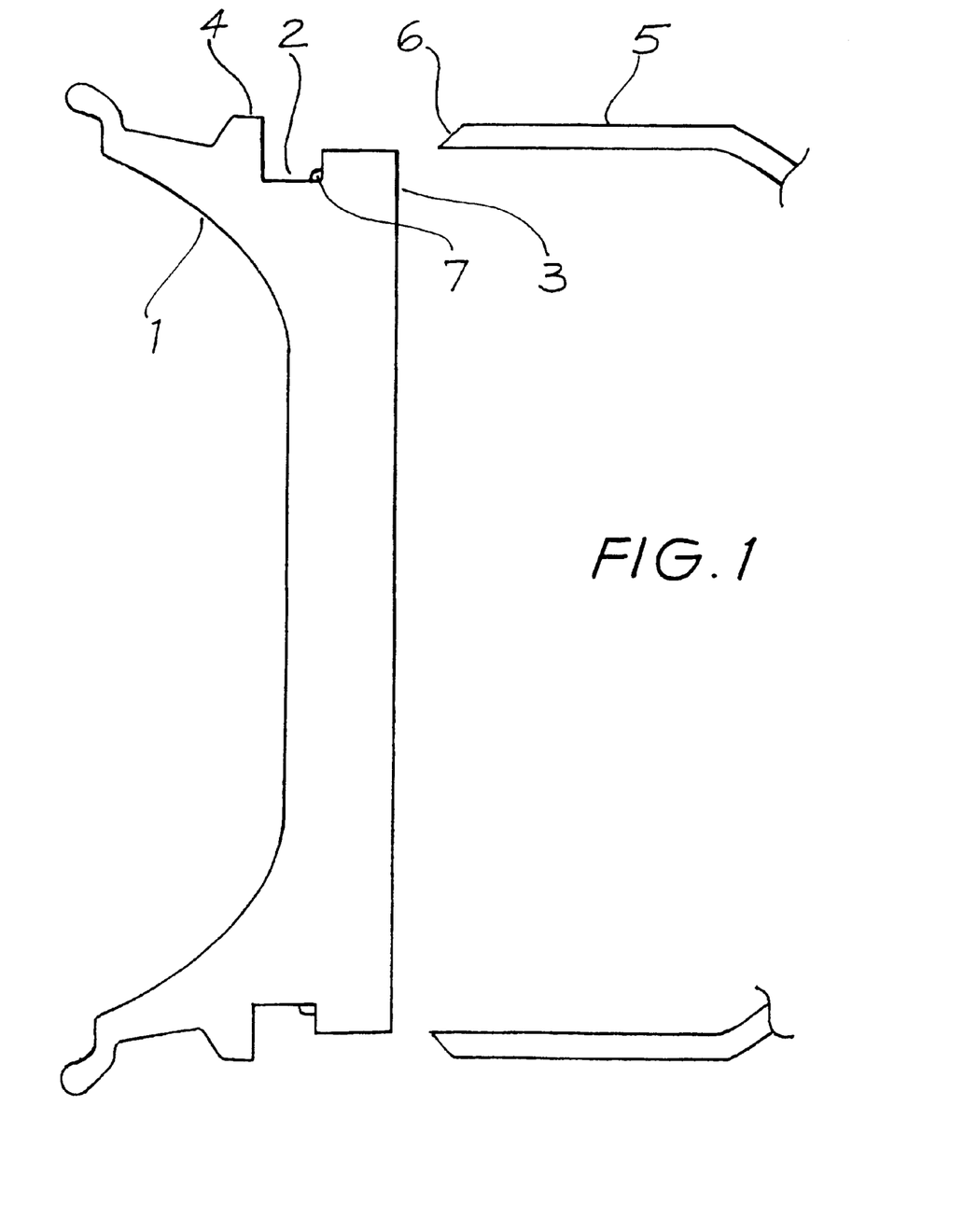
FIG. 1 illustrates a first step in a process embodying the invention.

The central component of the wheel, a cast, forged, machined or formed hub or center 1 features a circumferential groove 2 which is machined into it. The outer shoulder 3 of groove 2 has a smaller diameter than the interior shoulder or stop 4.

The preformed alloy tube 5 which is to become the wheel rim has its inner edge 6 beveled or knurled. An adhesive or sealant 7 may be applied to the mating faces of the central component 1 and the rim 5.

Figure 2:
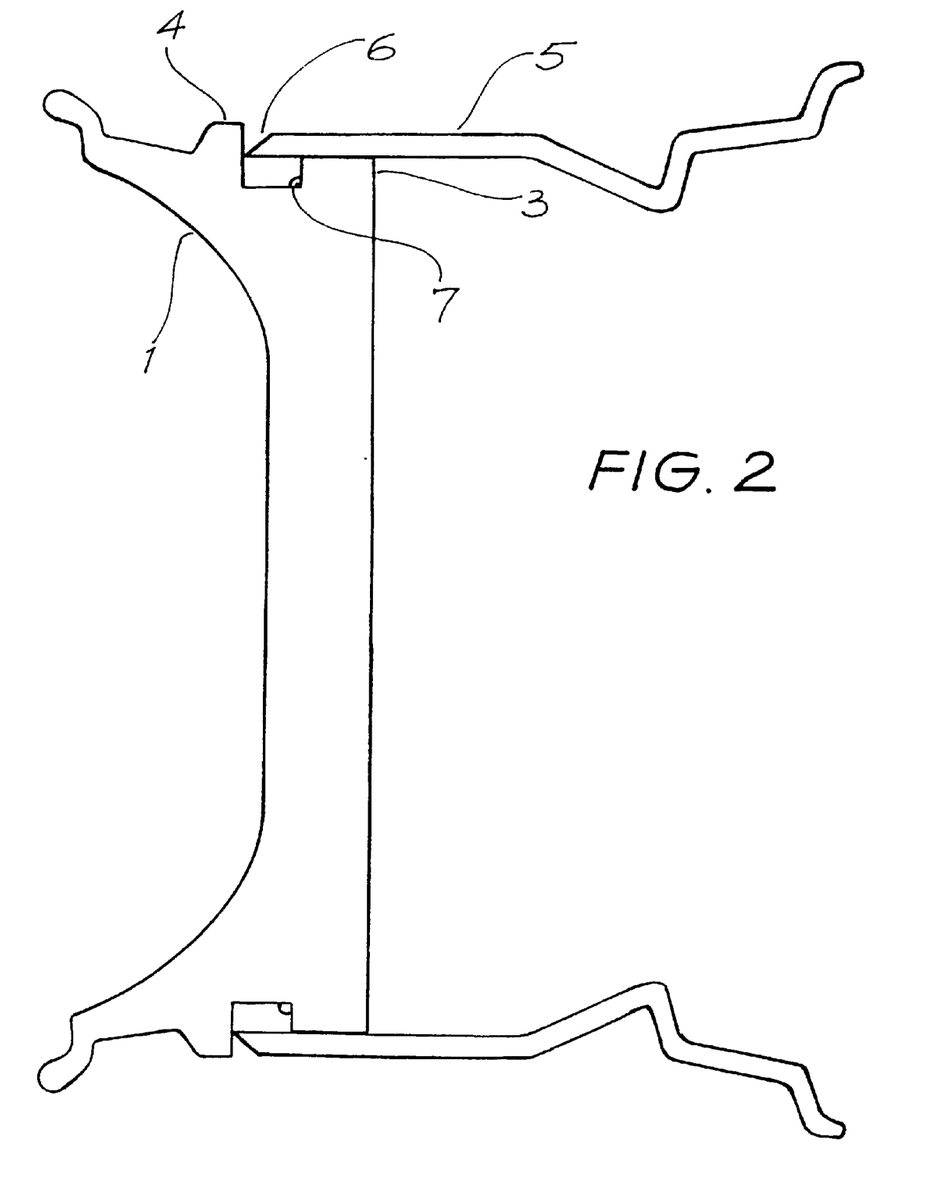
FIG. 2 illustrates a second step in the process.

The rim 5 is heated to expand it and increase its ductility or formability. It is not heated enough to anneal the material or to have any adverse affect on its mechanical properties. Once heated, the rim is pushed on to the central component 1 until the bevelled end 6 meets stop 4, as shown in FIG. 2.

Figure 3:
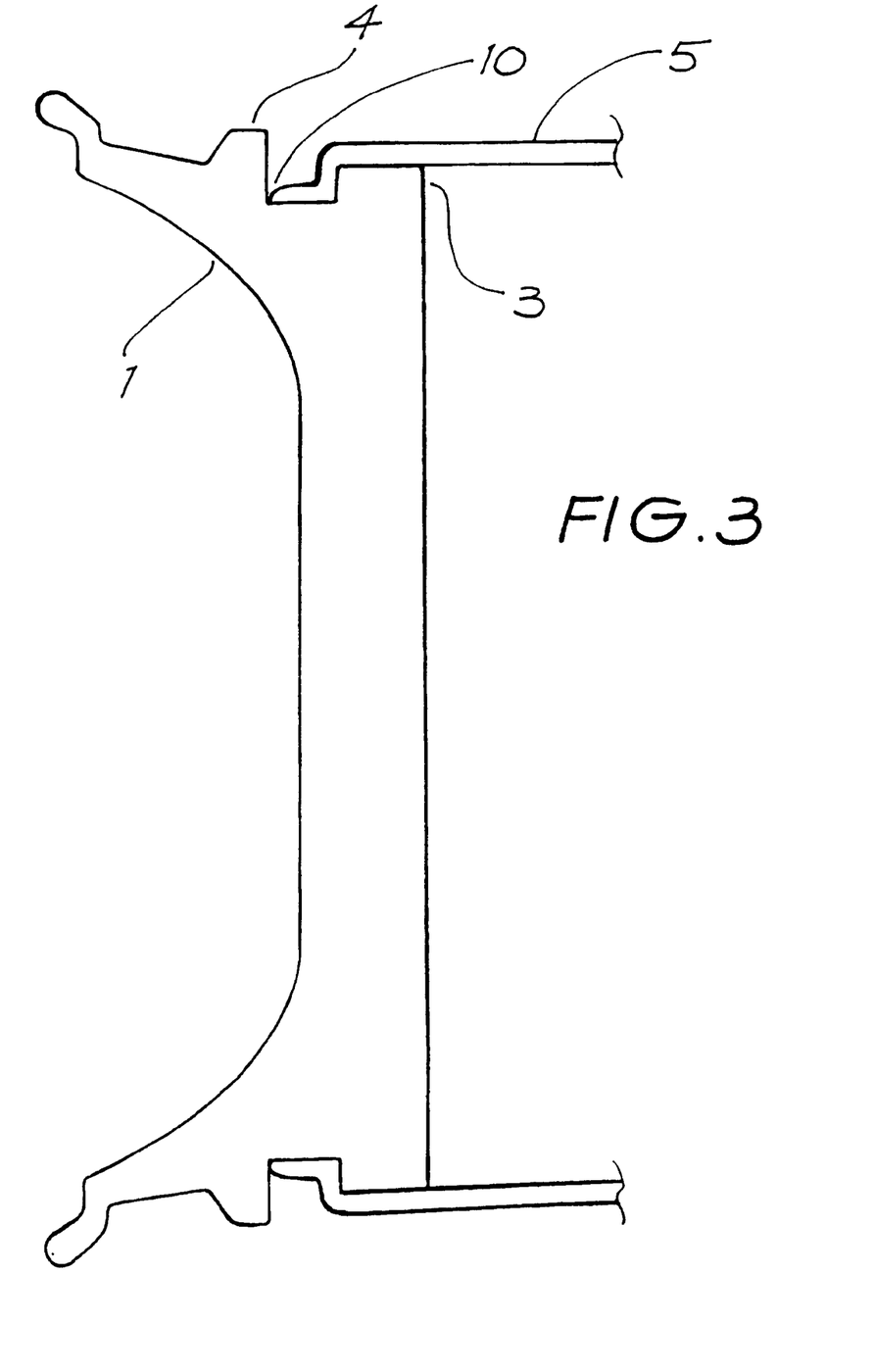
FIG. 3 illustrates a third step.

While still hot, the end of the rim 6 is rolled into groove 2, as shown in FIG. 3. The bevelled end of the rim results in a valley 10 being formed within groove 2.

Figure 4:
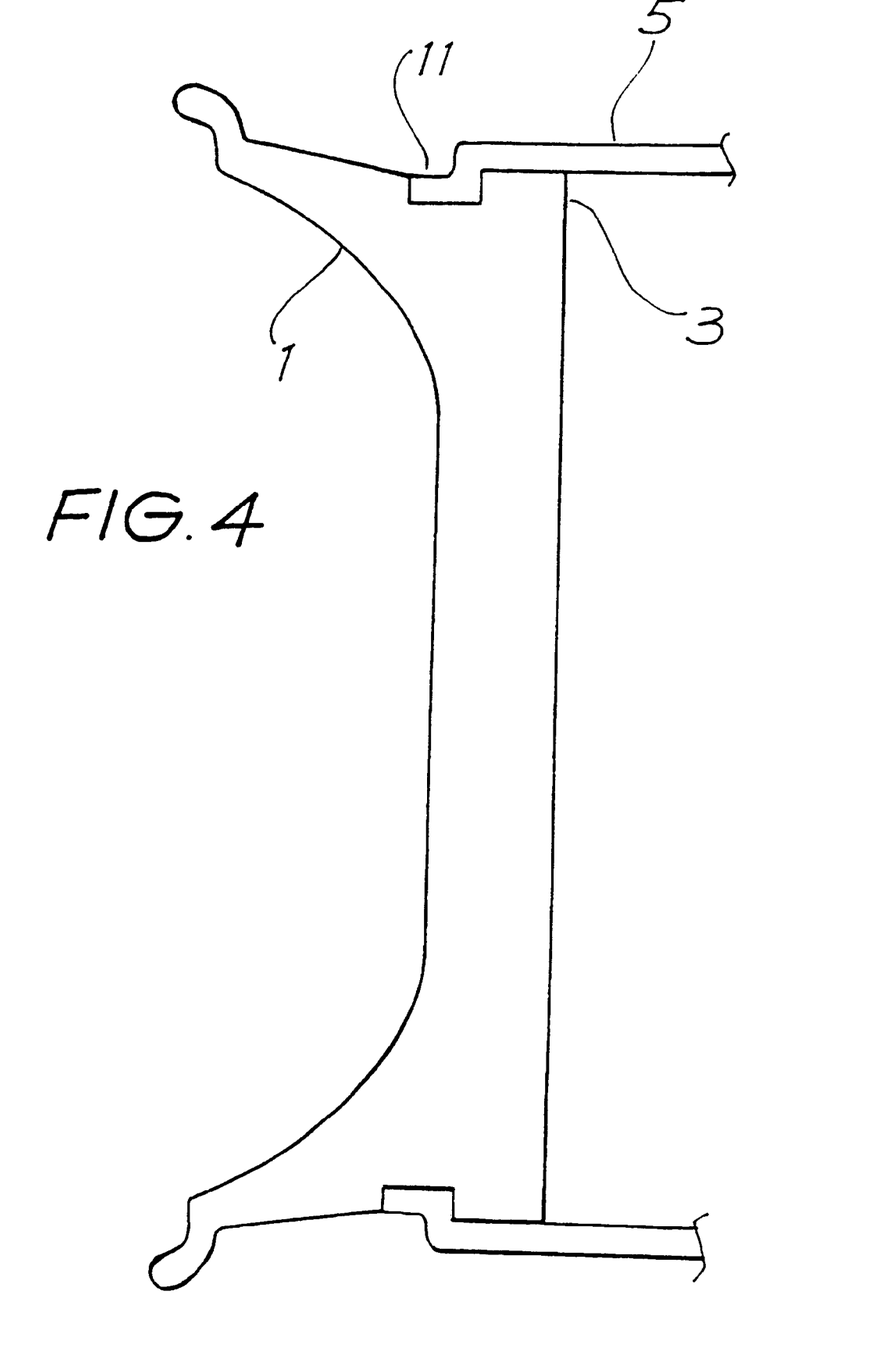
FIG. 4 illustrates a fourth step.

When hot, the stop 4 is spin forged into the valley 7 to leave a smooth finish 11 around the outer diameter of the wheel rim; as shown in FIG. 4.

The entire process may be performed on one relatively simple and inexpensive machine. Energy consumption is low, noise emission is low, and there is very little fume output. The time to complete join on the machine may be less than twenty seconds, and even as little as five seconds.

Figure 5:
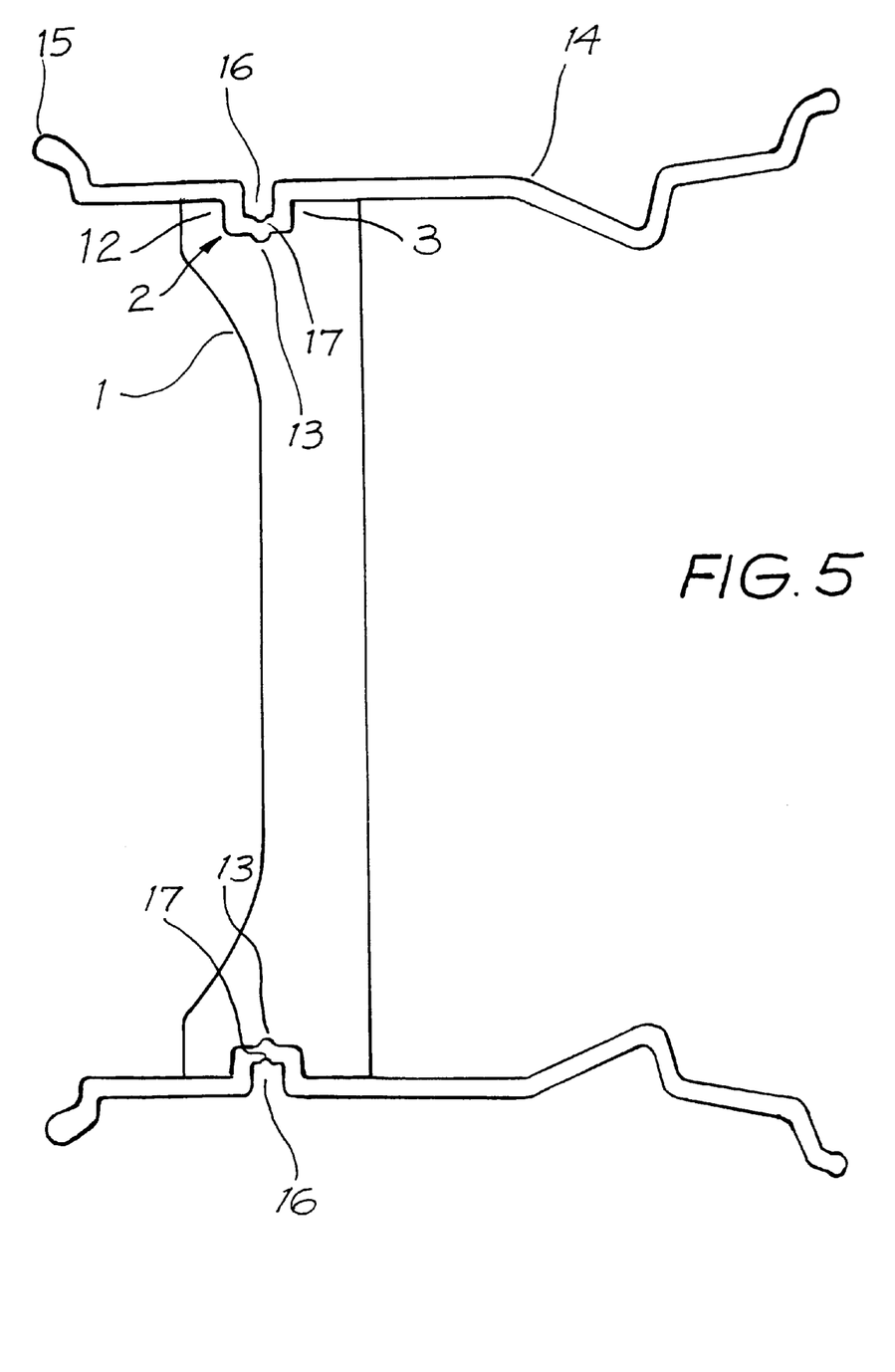
FIG. 5 illustrates a vehicle wheel constructed to a variation of the process.

Referring now to FIG. 5, the central component 1 in this case includes a central groove 2 having outer shoulder 3 and an inner shoulder 12. In the bottom of groove 2 there are concave dimples 13 around the circumference.

The rim 5 comprises both exterior rim parts 14 and interior rim parts 15, and also has a circumferential groove 16 which is rolled out of the flat rim into groove 2, while the rim is heated. The rim material is impressed into the dimples 13 in the floor of the groove to central component 1 in order to form dimples 17 in the exterior of the rim. The interlocking dimples 13 and 17 provide a mechanical anti-rotation lock. This shows a lightweight two piece car wheel, with the entire rim section formed separate from the center component.

Although the invention has been described with reference to forming a vehicle wheel it should be appreciated that it may be applied to the construction of many other items, including the construction of alloy space frame such are used in the construction of passenger vehicles. It should also be appreciated that the simple rolling of the rim into the groove and the shrinkage should be perfectly reliable in many applications, but that the spin forging of the stop, of the use of adhesive or interlocking formations improves the joint.

The invention makes possible reliable joints between dissimilar materials. The rim, or tube, component would always be metal, either steel, aluminium or possibly titanium, magnesium or other structural metal. But the hub, or male component, could be either metal or possibly plastic or composite material, such as carbon fibre or metal matrix composite.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of joining a central component with a metal tube, comprising the steps of:

providing a central component;

forming an external circumferential groove in the central component;

providing a metal tube separate from the central component;

heating the metal tube to expand its diameter, but not sufficiently to anneal it or otherwise adversely affect its mechanical properties;

while the metal tube is still hot, pushing the metal tube over part of the central component so that part of the metal tube overlies the circumferential groove;

while the metal tube is still hot, rolling a circumferential part of the metal tube which overlies the groove into the groove so that when cooled the rolled part of the metal tube is clamped into the groove, and shrinking the metal tube onto the exterior of the central component.

2. The method according to claim 1 wherein the circumferential groove is formed in the central component by machining.

3. The method according to claim 1, wherein the circumferential part of the metal tube that is rolled into the circumferential groove in the central component is an end part and the central component has a stop along one side of the groove.

4. The method according to claim 2, wherein the circumferential part of the metal tube that is rolled into the circumferential groove in the central component is an end part and the central component has a stop along one side of the groove.

5. The method according to claim 4, wherein the heated metal tube is pushed over the central component from a side of the central component opposite the stop until the end of the metal tube abuts the stop.

6. The method according to claim 5, wherein the end of the tube abutting the stop is beveled or knurled.

7. The method according to claim 6, wherein after the end of the metal tube has been rolled into the groove and while the metal tube is still hot, the stop is spin forged into a space remaining in the groove adjacent the beveled or knurled end of the metal tube.

8. The method according to any one of claims 1 to 7, wherein an adhesive is applied to the groove prior to pushing the metal tube over the central component.

9. The method according to any one of claims 1 to 7, wherein dimples are formed in a base of the groove into which the metal tube is rolled.

10. The method according to any one of claims 1 to 7, wherein the central component is a cast, machined, formed or forged hub of a vehicle wheel and the metal tube is a formed tubular rim of the vehicle.

11. A method of joining a forged, machined, formed or cast central component with a metal tube, comprising the steps of:

providing a central component;

forming an external circumferential groove in the central component;

providing a metal tube separate from the central component;

pushing the metal tube over part of the central component so that part of the metal tube overlies the circumferential groove in the central component;

heating the metal tube, but not sufficiently to anneal it or otherwise adversely affect its mechanical properties, and while the metal tube is still hot, rolling the circumferential part of the metal tube which overlies the groove into the groove so that when cooled the rolled part of the metal tube is clamped into the groove, and shrinking the metal tube onto the exterior of the central component.

12. The method according to claim 11 wherein the circumferential groove is formed in the central component by machining.

13. The method according to claim 11, wherein the circumferential part of the metal tube that is rolled into the circumferential groove in the central component is an end part and the central component has a stop along one side of the groove.

14. The method according to claim 12, wherein the circumferential part of the metal tube that is rolled into the circumferential groove in the central component is an end part and the central component has a stop along one side of the groove.

15. The method according to claim 13, wherein the metal tube is pushed over the central component from a side of the central component opposite the stop until the end of the metal tube abuts the stop.

16. The method according to claim 15, wherein the end of the tube abutting the stop is beveled or knurled.

17. The method according to claim 16, wherein after the end of the metal tube has been rolled into the groove and while the metal tube is still hot, the stop is spin forged into a space remaining in the groove adjacent the beveled or knurled end of the metal tube.

18. The method according to any one of claims 11 to 17, wherein an adhesive is applied to the groove prior to pushing the metal tube over the central component.

19. The method according to any one of claims 11 to 17, wherein dimples are formed in a base of the groove into which the metal tube is rolled.

20. The method according to any one of claims 11 to 17, wherein the central component is a cast, machined, formed or forged hub of a vehicle wheel and the metal tube is a formed tubular rim of the vehicle.

* * * * *

UNITED STATES PATENT AND TRADEMARK OFFICE
CERTIFICATE OF CORRECTION

PATENT NO. : 6,533,362 B1
DATED : March 18, 2003
INVENTOR(S) : Anthony Grant Simmons It is certified that error appears in the above-identified patent and that said Letters Patent is hereby corrected as shown below:

Column 1,
Line 19, "generate" should read -- generates --
Line 49, "on to" should read -- onto --
Line 61, "bevelled" should read -- beveled --
Line 65, "bevelling" should read -- beveling --

Column 2,
Line 23, "bevelling" should read -- beveling --
Line 34, "on to" (both occurrences) should read -- onto --
Line 41, "on to" should read -- onto --
Line 45, "bevelled" should read -- beveled --
Line 57, "on to" should read -- onto --

Column 3,
Line 19, "on to" should read -- onto --
Lines 20 and 23, "bevelled" should read -- beveled --
Line 44, "two piece" should read -- two –piece --
Line 50, "frame" should read -- frames --; and "are" should read -- as --
Line 54, "of" (second occurrence) should read -- or --

Column 4,
Line 22, "groove, and" should read -- groove; and --
Line 25, "claim 1" should read -- claim 1, --

UNITED STATES PATENT AND TRADEMARK OFFICE
CERTIFICATE OF CORRECTION

PATENT NO. : 6,533,362 B1
DATED : March 18, 2003
INVENTOR(S) : Anthony Grant Simmons It is certified that error appears in the above-identified patent and that said Letters Patent is hereby corrected as shown below:

<u>Column 5,</u>
Line 5, "properties," should read -- properties; --
Line 6, "and" should be deleted
Line 10, "groove, and" should read -- groove; and --

Signed and Sealed this

First Day of July, 2003

JAMES E. ROGAN
*Director of the United States Patent and Trademark Office*